United States Patent [19]

Hutchings et al.

[11] 3,752,586
[45] Aug. 14, 1973

[54] MINIMIZING FREQUENCY LOCKING IN RING LASER GYROSCOPES

[75] Inventors: Thomas J. Hutchings, Orange; Joseph Winocur, Newport Beach, both of Calif.

[73] Assignee: North American Rockwell Corporation, El Segundo, Calif.

[22] Filed: Aug. 4, 1969

[21] Appl. No.: 849,262

Related U.S. Application Data

[63] Continuation-in-part of Ser. No. 637,832, May 11, 1967, abandoned.

[52] U.S. Cl............................. 356/106 LR, 332/7.51
[51] Int. Cl............................. H01s 3/05, H01s 3/10
[58] Field of Search............................. 356/106 RL

[56] References Cited
UNITED STATES PATENTS 3,462,708   8/1969   McClure....................... 356/106 LR
3,528,029   9/1970   Nolmboe et al.............. 356/106 LR
3,373,650   3/1968   Killpatrick................... 356/106 LR

OTHER PUBLICATIONS

Hutchings et al., "Amplitude and Frequency Characteristics of a Ring Laser", 12/2/66, Pg. 467–473, Physical Review, Vol. 152, No. 1.

Primary Examiner—Benjamin A. Borchelt
Assistant Examiner—N. Moskowitz
Attorney—William R. Lane, L. Lee Humphries and Richard J. Rengel

[57] ABSTRACT

A ring laser gyroscope utilizes a pair of oppositely rotating beams which are given a difference frequency in accordance with the rotation rate of their optical paths. A plurality of frequency modulated bias signals are imposed upon the beams, the modulation indices of these frequency modulation signals being chosen to minimize the effects of frequency locking at low rotation rates.

10 Claims, 3 Drawing Figures

PATENTED AUG 14 1973 3,752,586

INVENTORS
THOMAS J. HUTCHINGS
JOSEPH WINOCUR
BY
*Richard S. Lengel*
ATTORNEY

MINIMIZING FREQUENCY LOCKING IN RING LASER GYROSCOPES

This application is a continuation-in-part of our application Ser. No. 637,832 entitled RING LASER GYROSCOPE OPTICAL CONFIGURATION, filed May 11, 1967, and now abandoned.

BACKGROUND OF THE INVENTION

1. Field of the Invention

This invention relates to ring laser gyroscopes, and more particularly to a technique and apparatus utilizing a plurality of frequency modulation bias signals to minimize the effects of frequency locking in such a device.

2. Description of the Prior Art

A ring laser gyroscope as described, for example, in our aforementioned prior application, is a resonant optical cavity that contains two oppositely directed traveling waves generated by stimulated emission of light, such waves following opposite paths around a ring. When the gyro is at rest, the light waves have the same optical frequency and form a standing wave pattern. Rotation of the ring causes the frequency of the wave traveling in the direction of rotation to decrease and the frequency of the oppositely directed wave to increase. The frequency difference is proportional to the rotational rate and is detected by heterodyning the two waves on a photosensitive surface, the instrument thus functioning to detect rotational rates in the same manner as a conventional gyroscope.

A major problem area of the ring laser gyroscope is "frequency locking" between the signals whereby the heterodyne or beat frequency tends to go to zero at small rotation rates, this due to non-linear coupling between waves caused by back scattering of energy from one wave to another. This, of course, makes it impossible to provide a readout at low rotation rates, thus seriously hampering the utility of the instrument.

Various attempts have been made to solve this problem. One such expediency involves the use of a DC bias signal on the two waves so as to provide an initial difference frequency representing a zero rate input. This constant bias, of course, has to be set so as to keep the operation of the ring laser outside of the phase lock region for all possible inputs. The difficulty with this approach is the necessity for a very accurate stable bias source to avoid erroneous indications, especially where measuring low rotation rates. This particular approach therefore, while effective in eliminating frequency locking, presents an additional problem in maintaining accurate and reliable operation.

It has been found that frequency locking at low rotation rates can be lessened by imposing frequency modulation biases on the beams in phase opposition to each other and adjusting the modulation indices of these frequency modulation biases to a particular value which causes the sum of the energy in the odd order sidepairs of the signals to equal that in the even order sidepairs thereof. This tends to effect a balancing between the energy tending to cause the beams to frequency lock (the in phase sidepairs) and the energy tending to cause the beams to move apart in frequency (the out of phase sidepairs). While it would seem to appear that a single modulation of each of the beams in this manner should eliminate frequency locking, the general theory of a frequency modulated ring laser gyro shows that the optimum values of the modulation parameters depend upon the strength of the non-linear coupling between the oppositely rotating light beams. Thus the locking band will not disappear under typical operating conditions, if an artificial bias modulated at only a single frequency is used.

SUMMARY OF THE INVENTION

In carrying out this invention, the oppositely rotating beams of a ring laser gyroscope are each frequency modulated by a plurality of frequency modulation bias signals. The modulation indices of the frequency modulation signals are adjusted to provide minimum frequency locking over the contemplated range of operation of the gyroscope.

OBJECTS OF THE INVENTION

It is the principal object of this invention to provide means for minimizing frequency locking effects in ring laser gyroscopes throughout the operating range of such instruments.

Other objects of the invention will become apparent from the following description taken in connection with the accompanying drawings, of which:

DESCRIPTION OF THE PREFERRED EMBODIMENT

Figure 1:
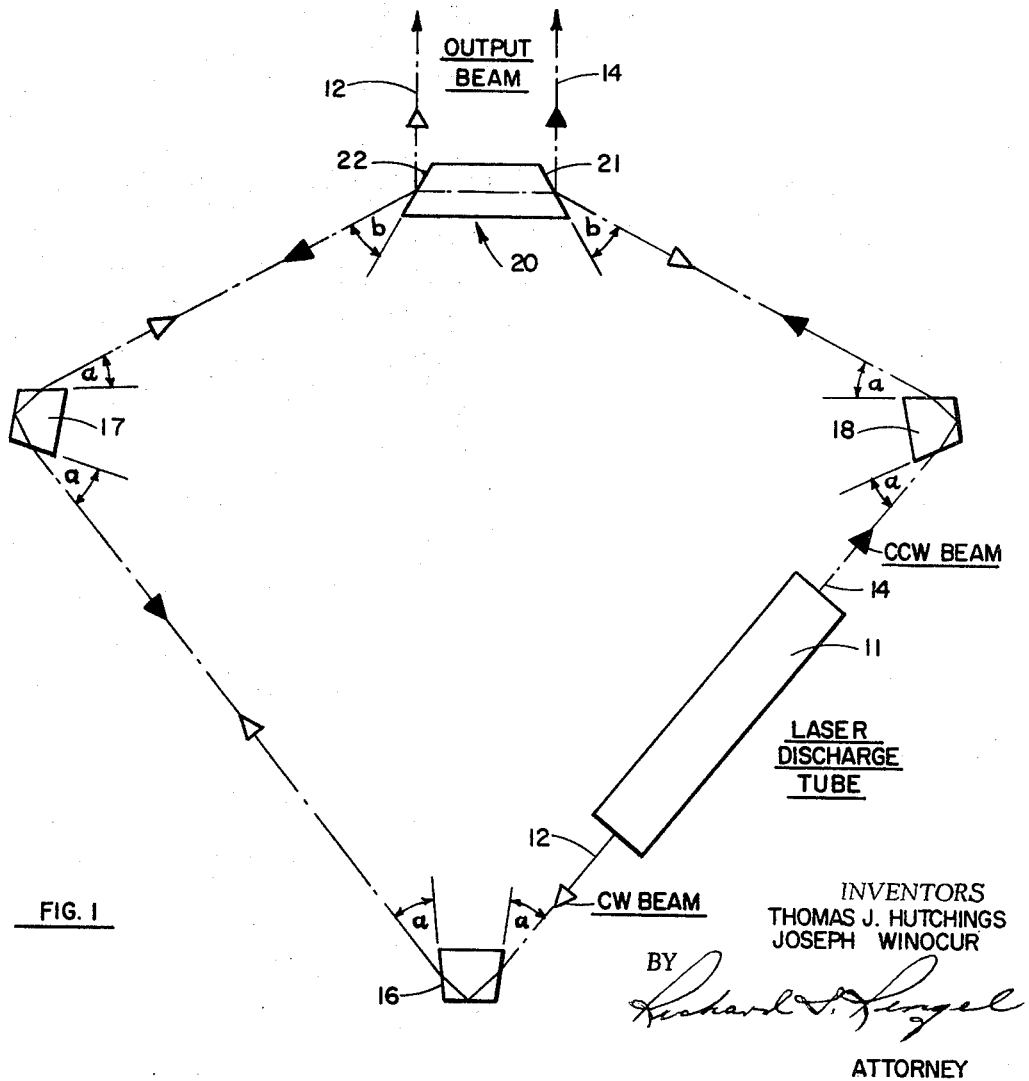
FIG. 1 is a schematic drawing illustrating the operation of a ring laser gyroscope with which the technique of this invention may be utilized.

Referring now to FIG. 1, a ring laser gyroscope is schematically illustrated. This particular device is thoroughly described in our aforementioned prior application and therefore will be but briefly described herein. Laser discharge tube 11, which may be a helium-neon plasma tube, operates to provide a beam 12 which rotates clockwise around the optical path and a beam 14 which rotates counterclockwise around the same path. Optical prisms 16, 17 and 18 act as corner reflectors to direct the two beams. Optical element 20 is interposed between reflectors 17 and 18 to complete the optical path and operates to refract the major portion of the two beams, rendering them colinear, a small portion of the beams being reflected off surfaces 21 and 22 to provide output beams. Element 20, as now to be explained in connection with FIG. 2, can also be utilized to introduce a frequency modulation bias signal onto the beams.

Figure 2:
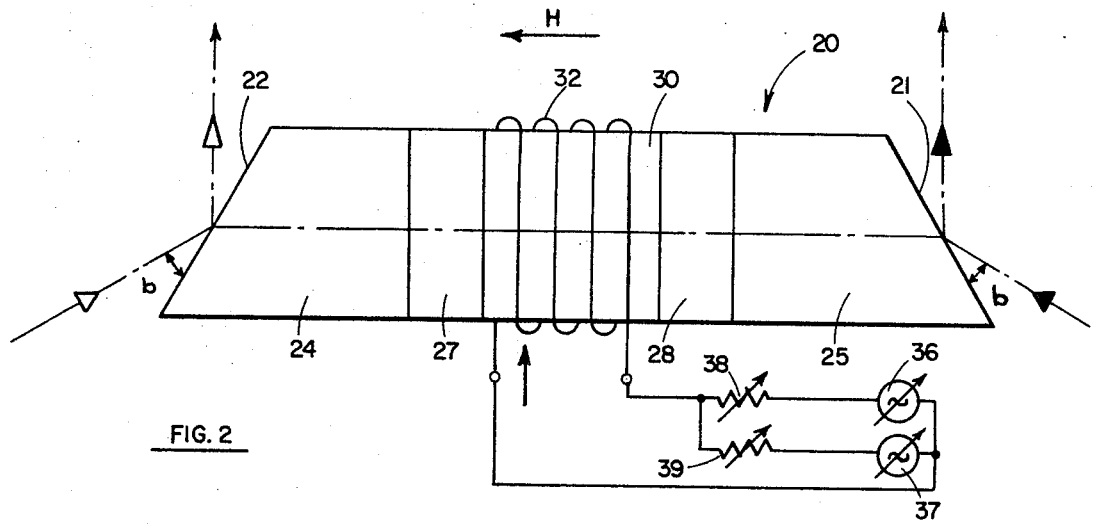
FIG. 2 is a schematic drawing illustrating application of the technique of this invention to the laser gyroscope of FIG. 1.

Referring now to FIG. 2, optical element 20 comprises prism elements 24 and 25 which may be made of optical glass, quarter wave plates 27 and 28 which may be of natural quartz, and an element 30 which may be of an optical material such as glass.

Most optical materials such as glass, when subjected to a magnetic field, becomes optically active, exhibiting a nonreciprocal birefringence for circularly polarized light. This effect, which is commonly referred to as the Faraday effect, results in a rotation of the plane of polarization for light propagating in the direction of or in opposition to the magnetic field. The light propagating against the field direction experiences a decrease in velocity in accordance with the intensity of the field, while the light propagating in the direction of the field experiences an increase of velocity in accordance with the field intensity. It is to be noted that the ring laser oscillates in a plain polarized mode, the plain polarized light passing through surfaces 21 and 22 and through prism elements 25 and 24 respectively, to the interface between these elements and the quarter wave plates 28 and 27. Quarter wave plates 28 and 27 operate to change the plain polarized light beams into circularly polarized light beams.

The application of an axial magnetic field to element 30 will cause the two circularly polarized light beams traversing this element to be rotated. However, in view of the fact that one beam is in the direction of the field and the other is against the field, these two beams see different optical path lengths, the difference in this path length being a function of the intensity of the magnetic field. This path length difference operates to introduce a frequency shift in the two beams such as to create a difference frequency therebetween.

When the circularly polarized light beams have traversed element 30, they are converted back to plain polarized beams by means of the quarter plates 27 and 28 respectively. The magnetic field, H, is generated by the current passed through windings 32 which are wound around element 30. Windings 32 are connected to receive the outputs of alternating current sources 36 and 37 through variable summing resistors 38 and 39 respectively. This results in a field which varies sinusoidally in accordance with the outputs of current sources 36 and 37, thus imposing frequency modulation on the two beams in accordance with the sinusoidal outputs of the AC sources 36 and 37. The frequency of the signal outputs of sources 36 and 37 and the amplitudes of these signals should be adjustable so that the modulation index of the frequency modulation can be adjusted for optimum effect in minimizing frequency locking, as to be explained further on in the specification. The instantaneous optical frequencies, $f_1'$ and $f_2'$, of the two beams when frequency modulated at a frequency, $F_b$, can be represented as follows:

$$f_1' = f_1 + B_m \cos 2\pi F_b t \quad (1)$$
$$f_2' = f_2 - B_m \cos 2\pi F_b t \quad (2)$$

where $B_m$ is the depth of modulation which is a function of the amplitude of the modulating signal, and $f_1$ and $f_2$ are the frequencies of the unmodulated beams.

Thus it can be seen that the optical frequency of one of the beams is shifted upward as the optical frequency of the other is shifted downward. The modulation index, $m'$, of the two beams is defined as follows:

$$m' = B_m/F_b \quad (3)$$

Thus it can be seen that the modulation index, $m'$ can be adjusted as desired by changing either the frequencies or the amplitudes of the outputs of AC power sources 36 and 37. The beat frequency signal produced by the heterodyning action between the two beams will have a frequency output $f_3'$ which may be represented as follows:

$$f_3' = f_1 - f_2 + 2 B_m \cos 2\pi f_b t \quad (4)$$

It thus can be seen that the modulation index, $m$ of the beat frequency output signal is twice the modulation index, $m'$ of the beams, i.e., $$m = 2m' = 2B_m/F_b \quad (4)$$

The frequency modulated beat frequency signal is detected by heterodyning the two beams on a photosensitive surface and demodulating to derive a carrier signal which represents the rotation rate, this being accomplished by techniques well known in the art.

Figure 3:
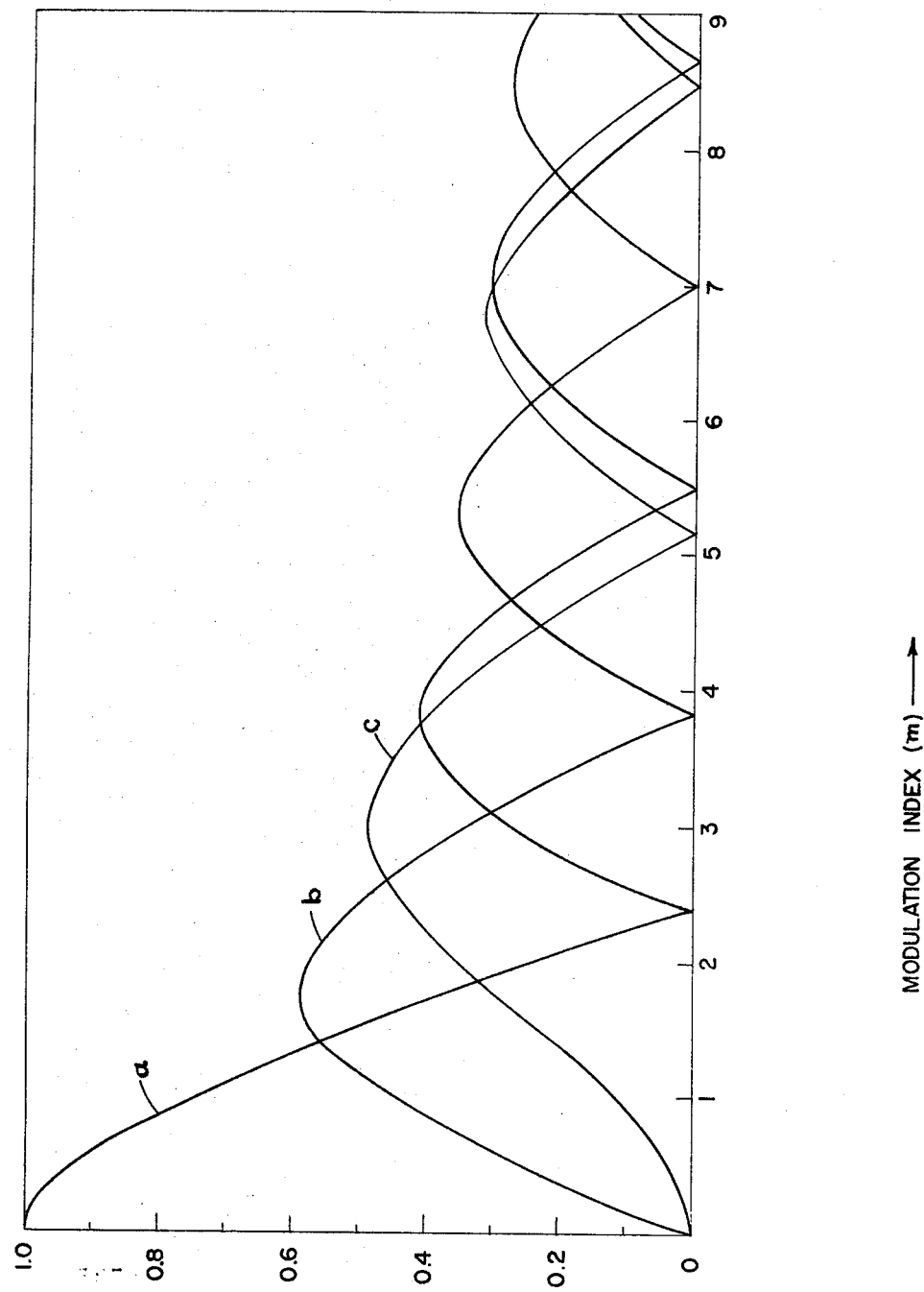
FIG. 3 is a graph illustrating the adjustment of modulation index by the technique of the invention to minimize frequency locking.

Referring now additionally to FIG. 3, a graph illustrating how the modulation index of the frequency modulation bias signals can be adjusted to minimize frequency locking is shown. It is to be noted that the modulation indices, $m$ represented in this graph are those in the beat signal generated from the two beams and are produced by using beam modulation indices, $m'$ which are half as large. It is further to be noted that graph line $a$ actually corresponds to the zero order Bessel function which denotes the amplitude of the carrier of the FM signal, graph $b$ corresponds to the first order Bessel function which denotes the amplitude of the first order side pairs of the FM signal, and graph $c$ corresponds to the second order Bessel function which denotes the amplitude of the second order side pairs of any frequency modulated signal. In this instance, however, these Bessel functions are plotted against indicia representing the width of the locking band. It thus would appear that locking at or near the carrier frequency, that is, with very low input rotation rates, can be eliminated or brought to zero by developing a modulation index, $m$ in the beat signal of either 2.4, 5.5, or 8.6, (beam modulation indices of 1.2, 2.75 or 4.3) as indicated by the points where graph line $a$ crosses the zero axis, this being accomplished by using a modulation index, $m'$ of one half of any of these values in modulating the beams.

Using just a single frequency modulation bias with one of these modulation indices, however, it has been found is only partially effective in eliminating locking at low rotation rates, as previously indicated. A second frequency modulation bias to operate to reduce the remaining carrier signal by an additional factor is therefore introduced. This second bias should like the first have a modulation index which will tend to make the carrier of the beat signal approach zero as indicated by the points where graph line $a$ crosses the zero axis.

In choosing the modulation indices of the two bias signals, several factors must be kept in mind. Firstly, as can be seen in FIG. 3, the first order sidebands (indicated by graph line $b$) with best signal modulation indices for a minimum carrier (2.4, 5.5 and 8.6) give rise to significantly large locking bands. As the first order sidebands are separated from the carrier by the modulation frequency, it is therefore necessary to make this modulation frequency high enough so as to be beyond the range associated with rotation rates at which the instrument is to be operated to avoid the effects of locking due to these sidebands.

Secondly, it is to be noted that the modulation bias signals interact with each other, one producing modulation sidebands on the other's sidebands. This also could give rise to locking bands within the operational range of interest.

The modulation frequency of the second bias signal should be chosen so that it is substantially lower than that of the first so that the lower order sidebands generated with the modulation of the first order sidebands of the first bias signal by the second bias signal will not fall within the operating range of the instrument.

Typical operating parameters are a modulation index of 1.2 for both bias signals with a modulation frequency of 50Khz for one and 5Khz for the other.

In situations where operation through a fairly wide range of rotation rates is desired, it may be necessary to provide means for automatically eliminating both bias signals whenever the instrument is being subjected to rates at which locking could occur due to the effects of the sidebands.

Thus it can be seen that by the frequency modulation technique of the invention, frequency locking can be effectively eliminated from ring laser gyroscopes. These results can be optimized for each particular application requirement by selective choice of the modulation indices and modulation frequencies utilized.

We claim:

1. A method for minimizing the frequency locking of a ring laser gyroscope comprising the steps of:
   generating first and second laser beams;
   causing said beams to rotate in a ring path in opposite directions around said path, said beams thus being caused to oscillate;
   frequency modulating said beams in phase opposition to each other with a plurality of signals of mutually different frequencies, each of said signals having a predetermined modulation index; and
   adjusting the modulation indices of said signals to minimize frequency locking of said beams.

2. The method of claim 1 wherein said beams are frequency modulated by applying magnetic fields which vary in accordance with said signals to an optical material in the optical path of said beams.

3. The method of claim 1 wherein said modulation indices are adjusted so as to cause the carrier of the beat signal generated between the frequency modulated signals to go substantially to zero.

4. The method of claim 1 wherein the modulation indices are each adjusted to one of the following: (1.2, 2.75, 4.3).

5. The method of claim 1 wherein in adjusting said modulation indices, the modulation frequencies are set so they are beyond the frequency corresponding to highest rotation rate to be measured by said gyroscope.

6. The method of claim 5 wherein the frequencies of said plurality of signals are substantially different, one from the other.

7. A method for minimizing the frequency locking of a ring laser gyroscope comprising:
   frequency modulating the beams of said laser with a first signal,
   frequency modulating the beams of said laser with a second signal, and
   adjusting said first and second modulation indices to values at which the amplitude of the carrier of the beat difference signal developed between said beams is minimized.

8. In a ring laser gyro including means for generating a pair of oppositely rotating beams, means for minimizing frequency locking of said beams comprising:
   an optical member interposed in the path of said beams,
   at least two A-C modulation means for imposing a plurality of magnetic fields on said optical member so as to frequency modulate said beams, and
   means for adjusting the frequency and amplitude of said modulation means to set the modulation indices of the modulation of said beams so as to minimize frequency locking thereof.

9. The device of claim 8 wherein said optical member has electrical windings thereon, said modulation means including A-C sources connected to said windings.

10. The device of claim 9 wherein said plurality of magnetic fields frequency modulate said beams at mutually different frequencies.

* * * * *